(12) United States Patent
Kitazawa et al.

(10) Patent No.: US 11,320,000 B2
(45) Date of Patent: May 3, 2022

(54) CLUTCH DEVICE

(71) Applicant: EXEDY Corporation, Neyagawa (JP)

(72) Inventors: Hidenori Kitazawa, Neyagawa (JP); Noriko Matsuyoshi, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 17/193,861

(22) Filed: Mar. 5, 2021

(65) Prior Publication Data

US 2021/0310524 A1 Oct. 7, 2021

(30) Foreign Application Priority Data

Apr. 1, 2020 (JP) .............................. JP2020-065998

(51) Int. Cl.
*F16D 13/64* (2006.01)
*F16D 13/52* (2006.01)
*F16D 13/74* (2006.01)
*F16D 13/62* (2006.01)

(52) U.S. Cl.
CPC ........... *F16D 13/648* (2013.01); *F16D 13/52* (2013.01); *F16D 13/62* (2013.01); *F16D 13/74* (2013.01)

(58) Field of Classification Search
CPC ........ F16D 13/648; F16D 13/52; F16D 13/74; F16D 13/62
See application file for complete search history.

(56) References Cited

U.S. PATENT DOCUMENTS

| 9,371,866 | B2* | 6/2016 | Raber | F16D 13/52 |
| 9,528,557 | B1* | 12/2016 | Heitzenrater | F16D 47/00 |
| 2011/0315505 | A1* | 12/2011 | Keating | F16D 13/683 192/112 |
| 2016/0123407 | A1* | 5/2016 | Chambrion | F16D 21/08 192/48.7 |

FOREIGN PATENT DOCUMENTS

| DE | 102015224753 B3 | * | 1/2017 |
| JP | 54-016060 | * | 2/1979 |
| JP | S54-016060 A | | 2/1979 |

* cited by examiner

*Primary Examiner* — Richard W Ridley
*Assistant Examiner* — Aimee Tran Nguyen
(74) *Attorney, Agent, or Firm* — United IP Counselors, LLC

(57) ABSTRACT

A clutch device includes a clutch plate and a clutch outer. The clutch plate includes a plurality of teeth circumferentially disposed apart from each other. The clutch outer includes a bottom portion, a plurality of cover portions, and a plurality of openings. The bottom portion has a disc shape and is greater in diameter than the clutch plate. The cover portions axially extend from an outer peripheral edge of the bottom portion so as to cover the teeth. The cover portions are circumferentially disposed apart from each other. Each opening is disposed between each adjacent pair of the cover portions. Each opening is radially opened.

7 Claims, 10 Drawing Sheets

CLUTCH DEVICE

CROSS-REFERENCE TO RELATED APPLICATIONS

This application claims priority to Japanese Patent Application No. 2020-065998, filed Apr. 1, 2020. The contents of that application are incorporated by reference herein in their entirety.

TECHNICAL FIELD

The present invention relates to a clutch device.

BACKGROUND ART

In general, motorcycles (a two-wheeled motorcycle, a buggy, etc.) use a clutch device so as to allow or block transmitting power from an engine to a transmission. The clutch device includes a clutch outer, a clutch center, a clutch plate, and a pressure plate. The clutch outer is coupled to an engine crankshaft side. The clutch center is coupled to a transmission side. The clutch plate is disposed between the clutch outer and the clutch center so as to allow or block transmission of power. The pressure plate is provided for pressing the clutch plate.

The clutch plate includes teeth protruding radially outward. The teeth are used for engagement with the clutch outer. The teeth are intensely abraded by sliding against the clutch outer. Because of this, it has been demanded to alleviate abrasion of the teeth of the clutch plate.

Japan Laid-open Patent Application Publication No. S54-016060 proposes a technology for alleviating abrasion of the teeth of a clutch plate in a clutch device. As the technology for the clutch device, a steel-plate clutch outer is proposed that is shaped to cover the teeth of the clutch plate and is also provided with an engaging tooth portion shaped to protrude radially outward of the clutch plate.

In the clutch device described in Japan Laid-open Patent Application Publication No. S54-016060, the clutch outer is made of a steel plate. Japan Laid-open Patent Application Publication No. S54-016060 describes that the clutch outer is provided with the engaging tooth portion protruding radially outward for a lightweight purpose. In other words, the engaging tooth portion is shaped to protrude radially outward to fit the shape of the teeth of the clutch plate. However, the following is concerned when the clutch outer is not made of a steel plate: If centrifugal forces act on the engaging tooth portion protruding from the clutch outer, stresses concentrate thereon whereby the clutch outer is damaged or broken.

BRIEF SUMMARY

It is an object of the present invention to enhance anti-abrasive properties of a clutch plate.

(1) A clutch device according to an aspect of the present invention includes a clutch plate and a clutch outer. The clutch plate includes a plurality of teeth circumferentially disposed apart from each other. The clutch outer includes a bottom portion, a plurality of cover portions, and a plurality of openings. The bottom portion has a disc shape and is greater in diameter than the clutch plate. The plurality of cover portions axially extend from an outer peripheral edge of the bottom portion so as to cover the plurality of teeth. The plurality of cover portions are circumferentially disposed apart from each other. Each of the plurality of openings is disposed between each adjacent pair of the plurality of cover portions. The each of the plurality of openings is radially opened.

In the present device, the clutch outer includes the cover portions. The cover portions cover the teeth of the clutch plate. Because of this, the clutch plate is enhanced in anti-abrasive properties.

(2) Each of the plurality of cover portions includes a recess on a radially inner surface thereof. Each of the plurality of teeth is disposed in the recess.

Each cover portion herein includes the recess on the radially inner surface thereof. Because of this, lubricating oil is accumulated in the recesses, whereby abrasion of the teeth can be inhibited.

(3) The recess has a depth greater in dimension than a height of the each of the plurality of teeth.

The recess herein has the depth greater than the height of each tooth. Hence, each cover portion can cover each tooth from the tip to the root part of each tooth.

(4) The clutch outer includes a plurality of coupling portions. The each adjacent pair of the plurality of cover portions is coupled to each other at distal ends thereof through each of the plurality of coupling portions.

Each adjacent pair of the cover portions is herein coupled to each other at the distal ends thereof through each coupling portion. Hence, even when centrifugal forces act on the clutch outer, the distal ends of the cover portions are prevented from flaring radially outward. Because of this, the clutch outer is enhanced in strength.

(5) The plurality of coupling portions are disposed radially outside the radially inner surfaces of the plurality of cover portions.

Even with the coupling portions herein provided, the lubricating oil is easily discharged.

(6) The recess of each of the plurality of cover portions is defined by surfaces. The surfaces include a bottom portion-side surface slanting to approach the bottom portion from radially outside to radially inside.

(7) The bottom portion and the plurality of cover portions are integrally molded.

Overall, according to the present invention described above, the clutch plate can be enhanced in anti-abrasive properties.

DETAILED DESCRIPTION

Entire Configuration

Figure 1:
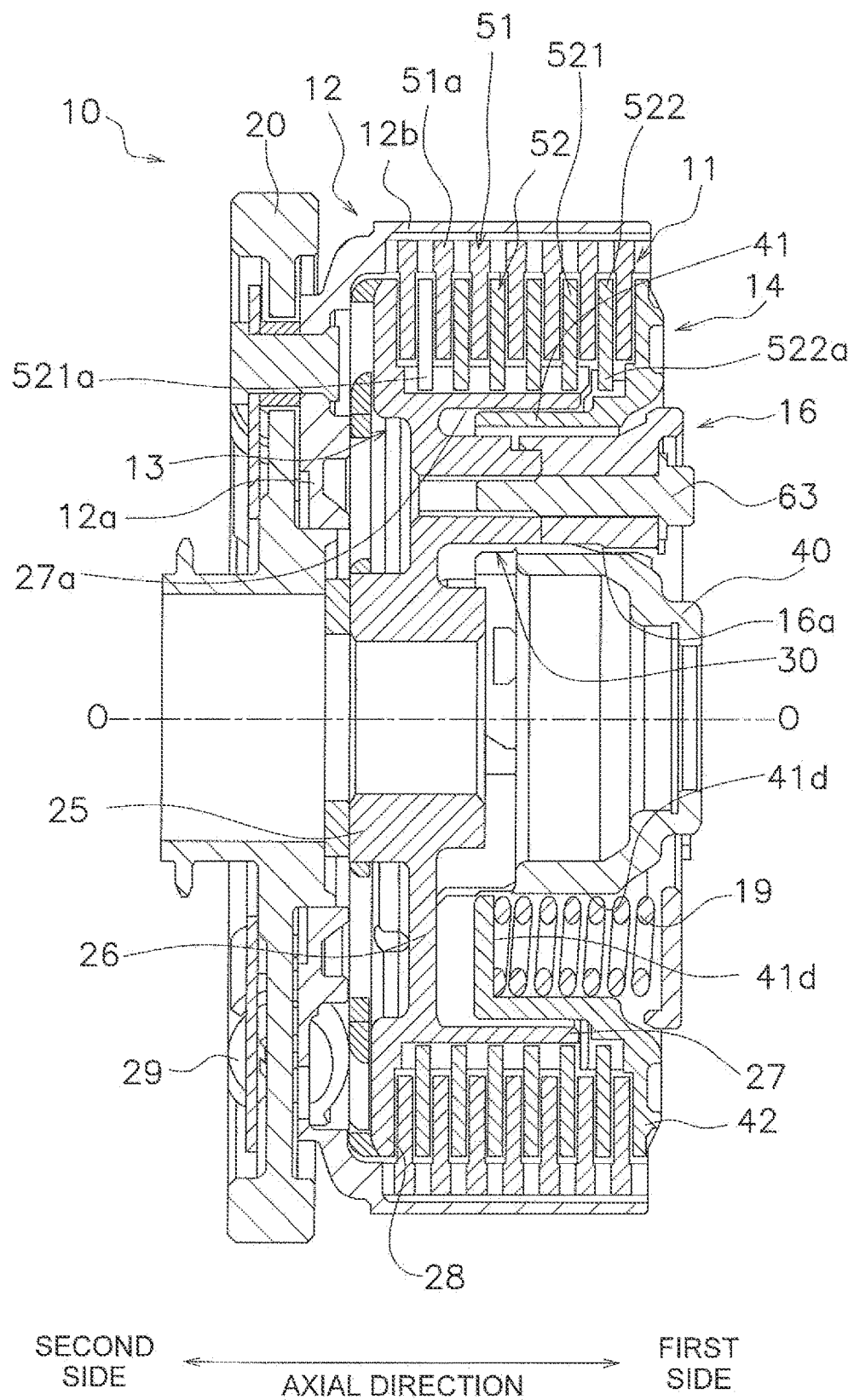
FIG. 1 is a cross-sectional view of a clutch device according to an embodiment of the present invention.

FIG. 1 shows a clutch device 10 for a motorcycle as a clutch device according to an embodiment of the present invention. In a cross-sectional view of FIG. 1, line O-O indicates a rotational axis. It should be noted that in the following explanation, the term "axial direction" indicates an extending direction of a rotational axis O. As shown in FIG. 1, the right side in FIG. 1 is defined as "a first side in the axial direction", whereas the left side in FIG. 1 is defined as "a second side in the axial direction". Besides, the term "radial direction" means a radial direction of an imaginary circle about the rotational axis O. Moreover, the term "circumferential direction" means a circumferential direction of the imaginary circle about the rotational axis O.

The clutch device 10 is configured to allow or block transmitting power from an engine to a transmission. The clutch device 10 includes a clutch plate 11, a clutch outer 12, a clutch center 13, a pressure plate 14, and a support plate 16. Besides, the clutch device 10 further includes a plurality of coil springs 19 for applying pressure.

Clutch Plate 11

The clutch plate 11 is disposed radially inside the clutch outer 12.

As shown in FIG. 1, the clutch plate 11 includes a plurality of drive plates 51 and a plurality of driven plates 52. Transmission of power is allowed or blocked between the clutch outer 12 and both the clutch center 13 and the pressure plate 14 through the drive plates 51 and the driven plates 52. Both types of the drive plates 51 and the driven 52 are alternately disposed in the axial direction, and each type has an annular shape.

Each drive plate 51 is provided with a plurality of teeth 51a disposed at intervals in the circumferential direction. The teeth 51a protrude radially outward from a radially outer part of each drive plate 51. Friction members are attached to both surfaces of each drive plate 51.

The driven plates 52 are composed of a plurality of first driven plates 521 and a single second driven plate 522. Each of the first and second driven plates 521 and 522 is provided with a plurality of engaging recesses 521a, 522a on the inner peripheral end thereof.

Clutch Outer 12

Figure 2:
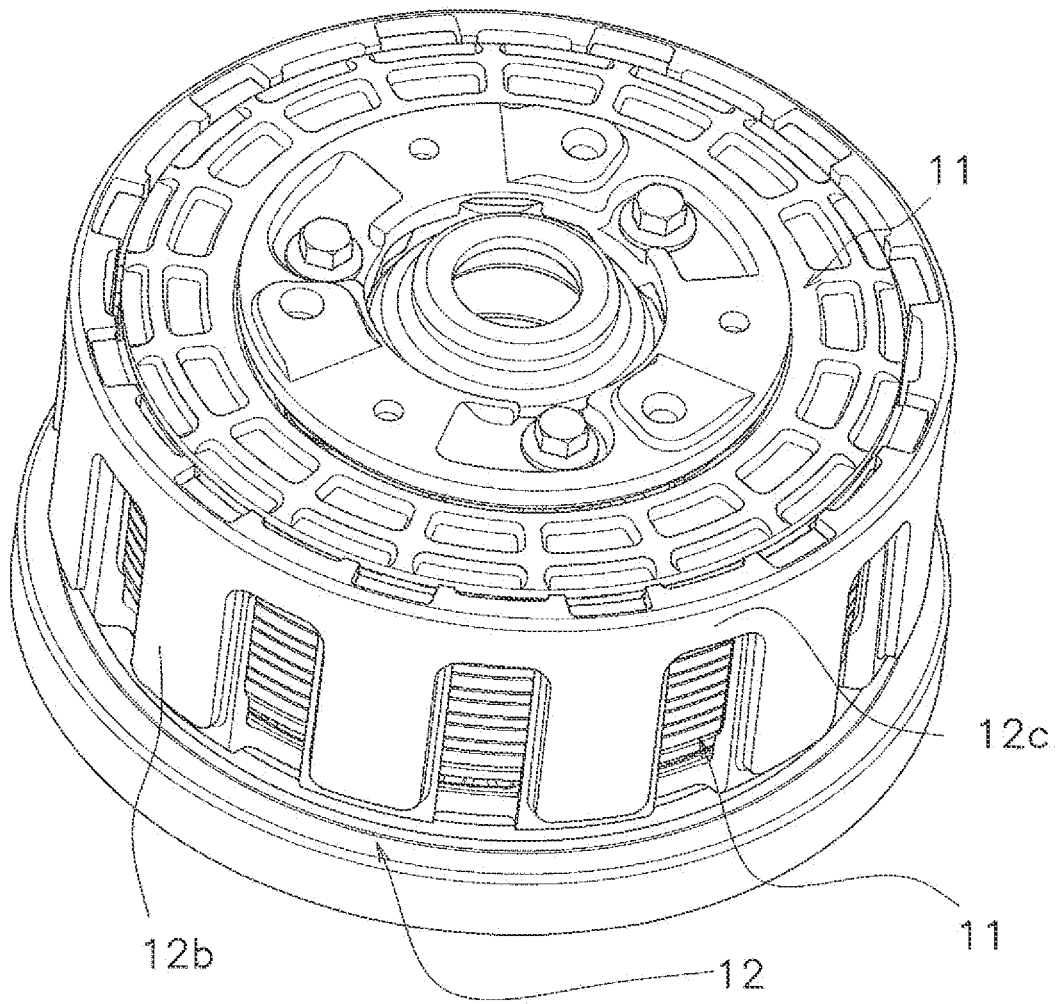
FIG. 2 is an external perspective view of a clutch outer and a clutch plate.
Figure 3:
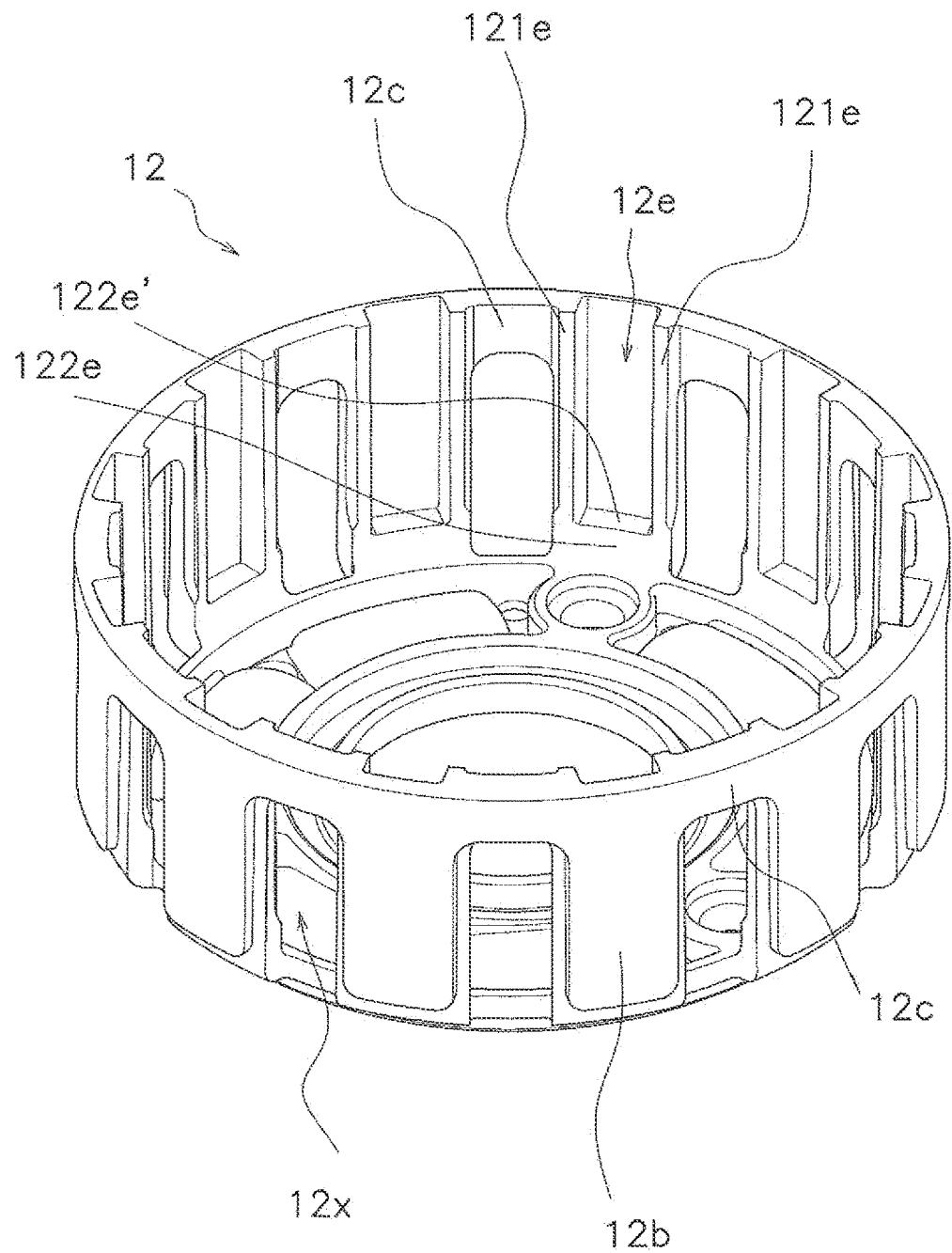
FIG. 3 is an external perspective view of the clutch outer.

With reference to FIGS. 1 to 3, the clutch outer 12 includes a bottom portion 12a, a plurality of cover portions 12b, a plurality of openings 12x, and a plurality of coupling portions 12c. The bottom portion 12a and the plural cover portions 12b are integrally molded by aluminum die casting. The clutch outer 12 is coupled to an input gear 20. The input gear 20 is meshed with a drive gear (not shown in the drawings) fixed to an engine-side crankshaft.

The bottom portion 12a has a disc shape. The bottom portion 12a is greater in diameter than the clutch plate 11. The bottom portion 12a is disposed coaxial to the clutch plate 11. The bottom portion 12a is a portion that the input gear 20 is coupled through a plurality of coil springs 29. The plural coil springs 29 are provided for absorbing vibration from the engine and are inserted into holes provided in the input gear 20.

The cover portions 12b are provided to extend from the outer peripheral edge of the bottom portion 12a to the first side in the axial direction. The respective cover portions 12b are disposed at intervals in the circumferential direction.

The cover portions 12b include recesses 12e on the radially inner surfaces thereof, respectively. The teeth 51a of the clutch plate 11 (the drive plates 51) are disposed in the recesses 12e. The drive plates 51 are meshed with the recesses 12e, whereby the drive plates 51 are unitarily rotated with the clutch outer 12. The drive plates 51 are axially movable with respect to the clutch outer 12, while being non-rotatable relative thereto.

With reference to FIG. 3, in each cover portion 12b, the recess 12e is defined by a pair of sidewall portions 121e and a bottom surface portion 122e. It should be noted that the recess 12e is opened to the first side in the axial direction.

Figure 4:
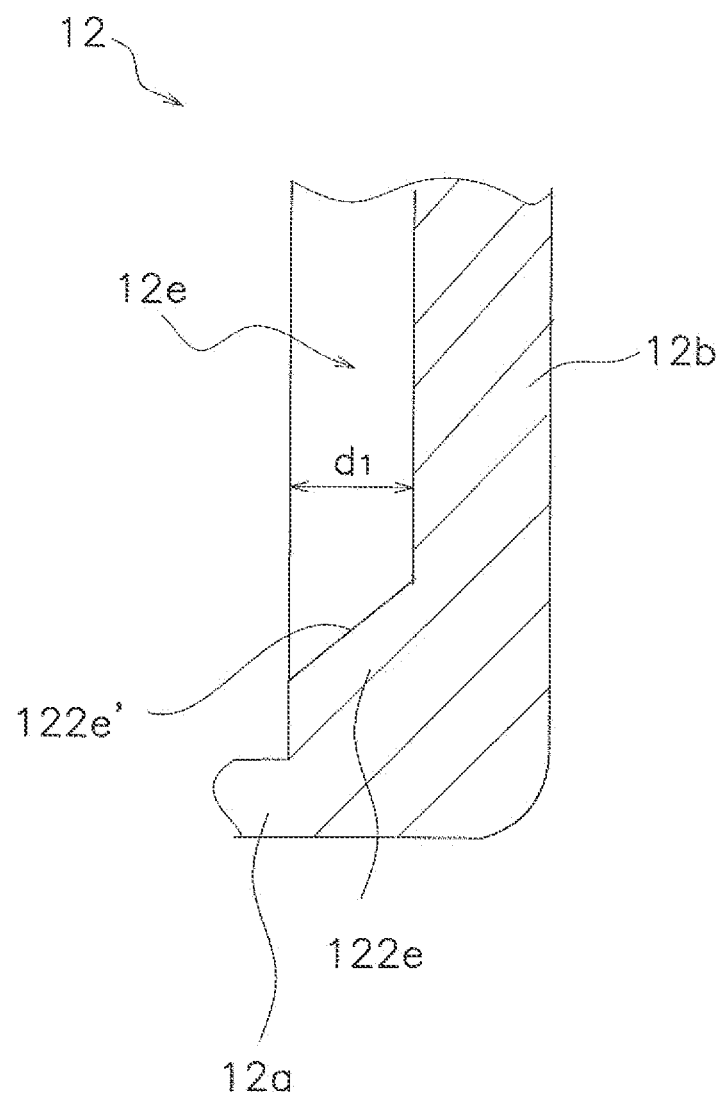
FIG. 4 is a cross-sectional view of a recess on a cover portion of the clutch outer.

With reference to FIG. 4, the recess 12e has a depth dl greater in dimension than the height of the tooth 51a. The depth of the recess 12e is a radial dimension of the recess 12e. Besides, among the surfaces defining the recess 12e in each cover portion 12b, a surface 122e' of the bottom surface portion 122e slants to approach the bottom portion 12a from radially outside to radially inside.

Each opening 12x is disposed between each adjacent pair of the cover portions 12b. Each opening 12x is radially opened to drain lubricating oil from inside to outside the clutch outer 12. Besides, each opening 12x further extends than each recess 12e to the second side in the axial direction.

Each coupling portion 12c couples the distal end portions of each adjacent pair of the cover portions 12b to each other.

Each coupling portion 12c is disposed between each adjacent pair of the sidewall portions 121e. Each coupling portion 12c is located radially outside the radially inner surface of each cover portion 12b. Specifically, the radially inner surface of each coupling portion 12c is located radially outside that of each sidewall portion 121e.

The radially outer surfaces of the plural cover portions 12b and those of the plural coupling portions 12c form a single outer peripheral surface. In other words, the radially outer surfaces of the cover portions 12b do not protrude radially outward with respect to those of the coupling portions 12c.

Clutch Center 13

Figure 5:
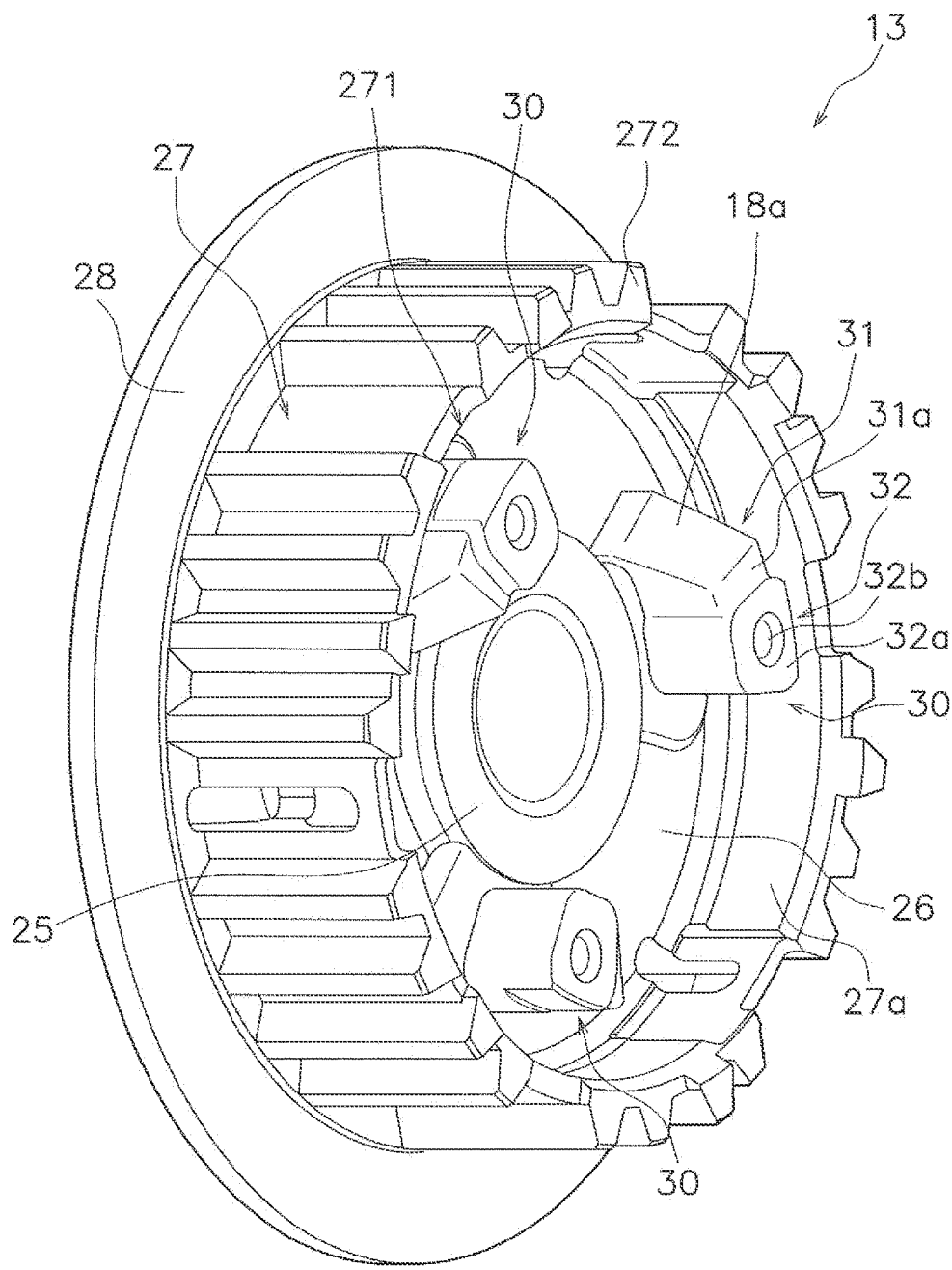
FIG. 5 is an external perspective view of a clutch center.

With reference to FIGS. 1 and 5, the clutch center 13 is disposed in the interior of the clutch outer 12, in other words, radially inside the cover portions 12b of the clutch outer 12. The clutch center 13 has an approximately disc shape. The clutch center 13 includes a boss portion 25 provided on the middle part thereof, a bottom portion 26, a tubular portion 27, and a pressure receiving portion 28.

The boss portion 25 extends in the axial direction. The boss portion 25 is provided with a spline hole (not shown in the drawings) in the middle part thereof. The spline hole extends in the axial direction. An input shaft of the transmission (not shown in the drawings) is engaged with the spline hole. It should be noted that the clutch center 13 is not moved in the axial direction.

The bottom portion 26 extends radially outward from the boss portion 25. The bottom portion 26 is provided with a plurality of first protruding portions 30. It should be noted that in the present embodiment, the bottom portion 26 includes three first protruding portions 30. The plural first protruding portions 30 are provided on a radially intermediate part of the bottom portion 26, while being disposed at intervals in the circumferential direction. The first protruding portions 30 protrude to the first side in the axial direction. Besides, the plural first protruding portions 30 are disposed apart from an inner peripheral surface 27a of the tubular portion 27. A gap is reliably produced between the outer peripheral surface of each first protruding portion 30 and the inner peripheral surface 27a of the tubular portion 27.

With reference to FIG. 5, each first protruding portion 30 includes a first cam protrusion 31 and a first fixation protrusion 32. The first cam protrusion 31 and the first fixation protrusion 32 are aligned in the circumferential direction. The first cam protrusion 31 and the first fixation protrusion 32 are provided as a single member.

The first cam protrusion 31 includes a CC cam surface 18a.

The first fixation protrusion 32 is greater in height than the first cam protrusion 31. In other words, a distal end surface 32a (axially first side end surface) of the first fixation protrusion 32 is located on the first side of a distal end surface 31a of the first cam protrusion 31 in the axial direction. It should be noted that the height of the first fixation protrusion 32 indicates the length thereof in the axial direction.

Besides, the first fixation protrusion 32 is provided with a screw hole 32b in the center part thereof. The screw hole 32b extends in the axial direction.

The tubular portion 27 is provided to extend from an outer part of the bottom portion 26 to the first side in the axial direction. The tubular portion 27 includes a body 271 having a cylindrical shape and a plurality of first teeth 272 provided for an engagement purpose on the outer peripheral surface of the body 271. The engaging recesses 521a of each first driven plate 521 are engaged with the first teeth 272. Therefore, each first driven plate 521 is axially movable with respect to the clutch center 13, while being non-rotatable relative thereto. In other words, each first driven plate 521 is unitarily rotated with the clutch center 13.

The pressure receiving portion 28 is provided on the outer peripheral side of the tubular portion 27 and further extends therefrom to the outer peripheral side. The pressure receiving portion 28 has an annular shape. The pressure receiving portion 28 is opposed to the clutch plate 11.

Pressure Plate 14

Figure 6:
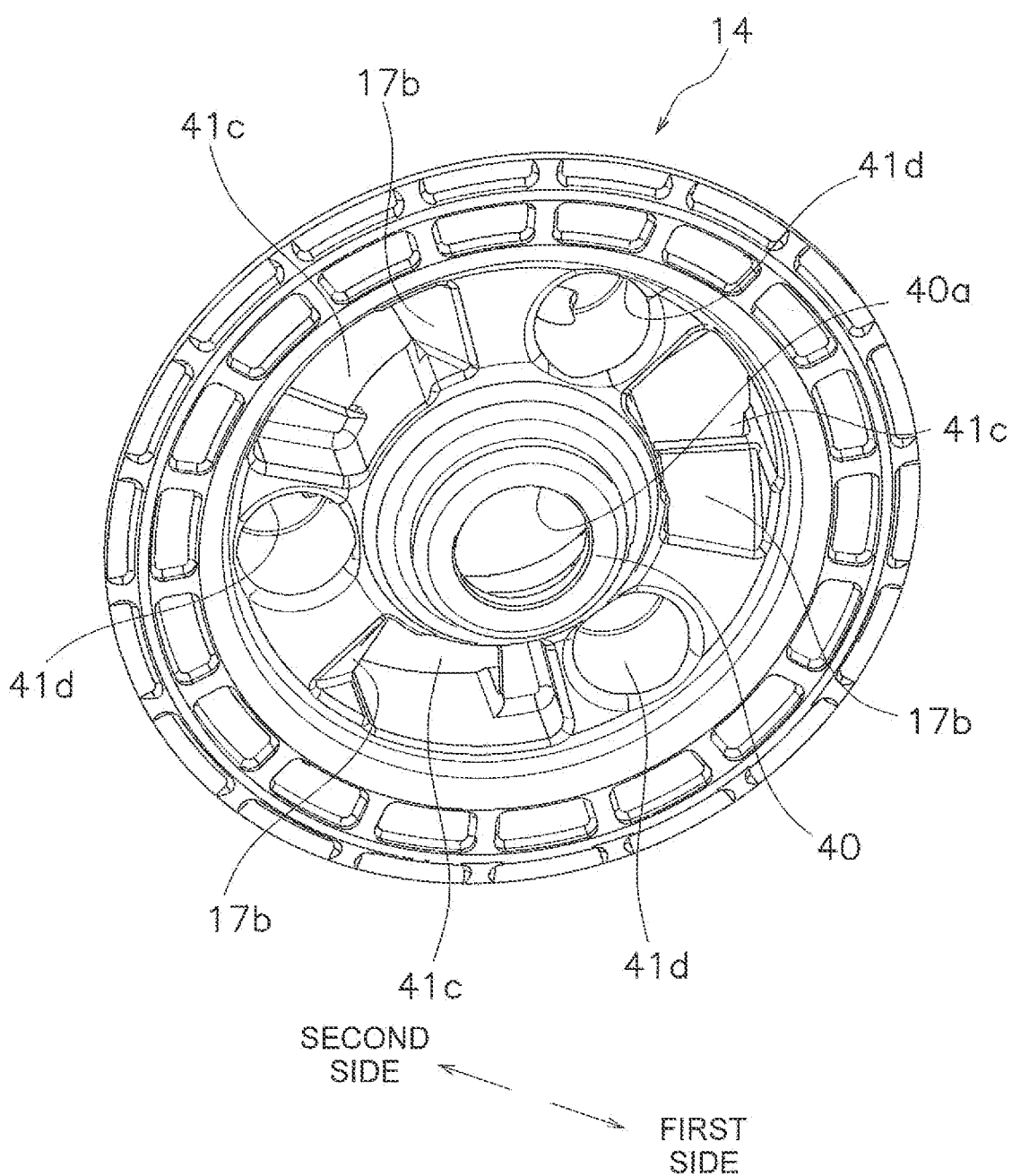
FIG. 6 is an external perspective view of a pressure plate as seen from a first side in an axial direction.
Figure 7:
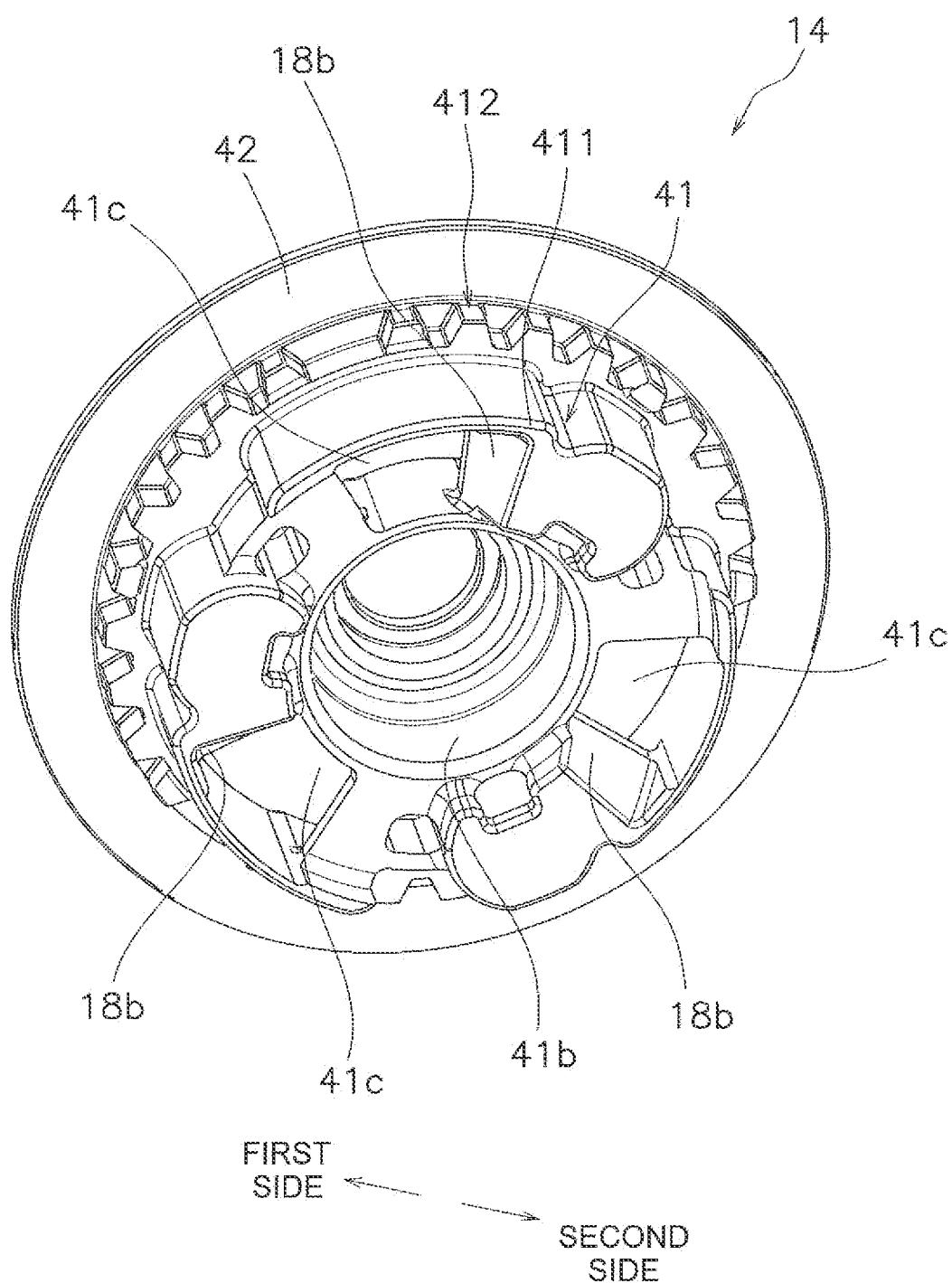
FIG. 7 is an external perspective view of the pressure plate as seen from a second side in the axial direction.

As shown in FIGS. 1, 6, and 7, the pressure plate 14 is a disc-shaped member. The pressure plate 14 is disposed on the first side of the clutch center 13 in the axial direction.

The pressure plate 14 is axially movable with respect to the clutch center 13. The pressure plate 14 includes a boss portion 40 provided on the middle part thereof, a tubular portion 41, and a pressure applying portion 42.

The boss portion 40 extends to protrude to the first side in the axial direction. The boss portion 40 defines a through hole 40a by the radially inner peripheral wall thereof. A release member (not shown in the drawings) is inserted into the through hole 40a.

The tubular portion 41 is provided radially outside the boss portion 40. The tubular portion 41 protrudes to the second side in the axial direction. The tubular portion 41 is disposed to overlap the tubular portion 27 of the clutch center 13 as seen in a radial view. Besides, the tubular portion 41 is disposed to be inserted into gaps produced between the tubular portion 27 and the first protruding portions 30 in the clutch center 13.

The tubular portion 41 includes a body 411 having a cylindrical shape and a plurality of second teeth 412. The second teeth 412 are provided on the outer peripheral surface of the body 411. The plural second teeth 412 are provided on the axially first side end on the outer peripheral surface of the body 411. The plural second teeth 412 are less in axial length than the body 411.

The engaging recesses 522a, provided for an engagement purpose on the second driven plate 522, are engaged with the second teeth 412. Therefore, the second driven plate 522 is axially movable with respect to the pressure plate 14, while being non-rotatable relative thereto. In other words, the second driven plate 522 is unitarily rotated with the pressure plate 14.

Besides, the tubular portion 41 includes a hole 41b, which has an approximately circular shape and is provided in the middle part thereof, a plurality of cam holes 41c, and a plurality of closed-end holes 41d. It should be noted that in the present embodiment, the tubular portion 41 includes three cam holes 41c and three closed-end holes 41d.

The pressure plate 14 includes PPa cam surfaces 17b for an assist cam mechanism 17 and PPs cam surfaces 18b for a slipper cam mechanism 18. Each PPa cam surface 17b and each PPs cam surface 18b are composed of inner wall surfaces defining each cam hole 41c. Each PPa cam surface 17b and each PPs cam surface 18b are opposed in the circumferential direction. Each PPa cam surface 17b faces the first side in the axial direction. Each PPs cam surface 18b faces the second side in the axial direction.

The closed-end holes 41d are each provided to be recessed at a predetermined depth from the axially first side surface of the tubular portion 41. As shown in FIG. 1, the coil springs 19 are disposed in the closed-end holes 41d, respectively.

The pressure applying portion 42 has an annular shape and is provided as the outer peripheral part of the pressure plate 14. The pressure applying portion 42 is disposed axially apart from the pressure receiving portion 28 at an interval. The pressure applying portion 42 is opposed to the clutch plate 11.

The clutch plate 11 is disposed between the clutch center 13 and the pressure plate 14. In other words, the pressure receiving portion 28, the clutch plate 11, and the pressure applying portion 42 are sequentially aligned in this order from the second side to the first side in the axial direction. The drive plates 51 and the driven plates 52 in the clutch plate 11 are disposed between the pressure receiving portion 28 and the pressure applying portion 42.

Support Plate 16

Figure 8:
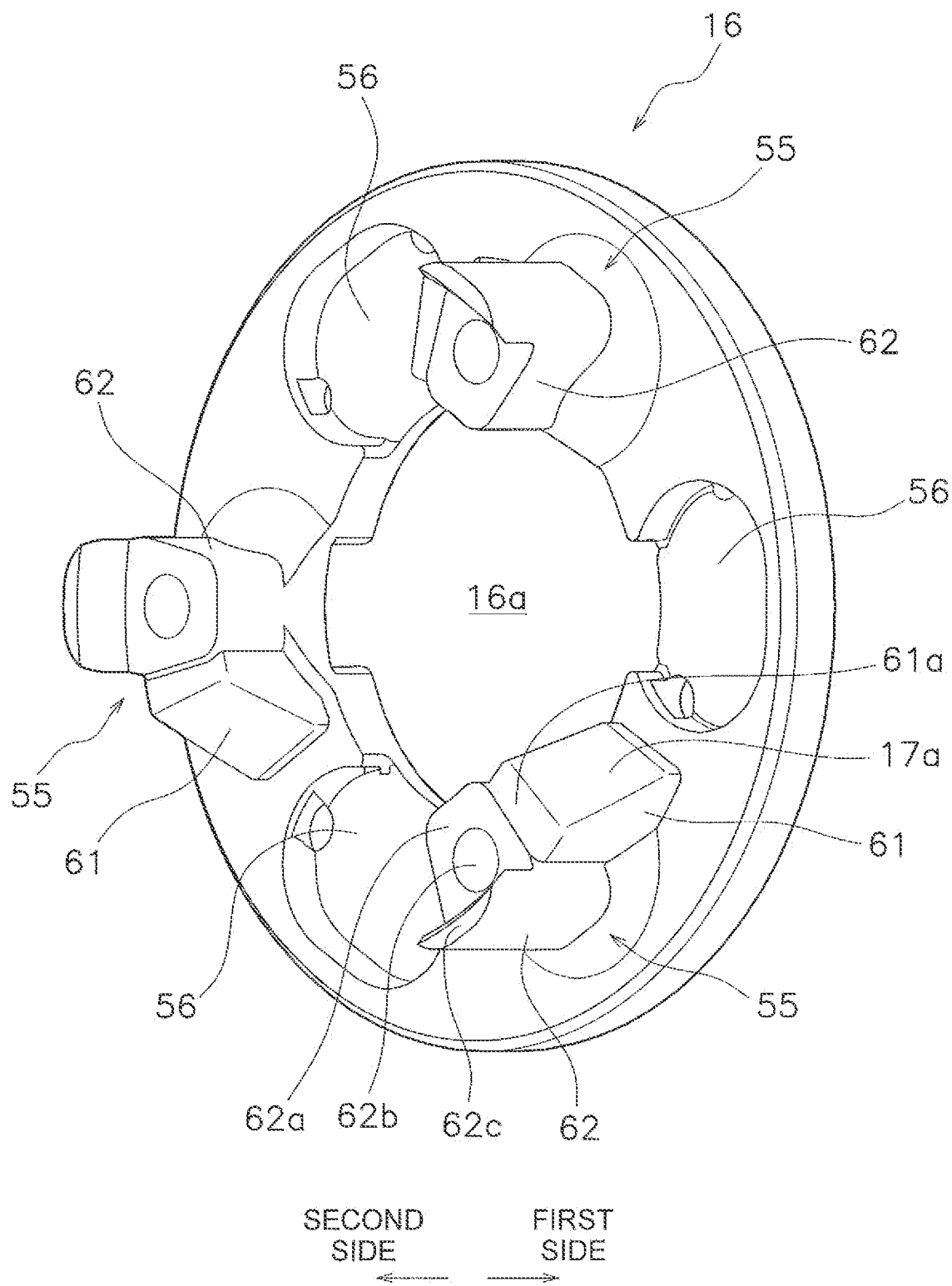
FIG. 8 is an external perspective view of a support plate.

As shown in FIGS. 1 and 8, the support plate 16 is a disc-shaped member and is disposed on the first side of the pressure plate 14 in the axial direction. The support plate 16 includes a hole 16a in the middle part thereof. The hole 16a is penetrated by the boss portion 40 of the pressure plate 14.

Besides, the support plate 16 includes a plurality of second protruding portions 55 and a plurality of recesses 56. It should be noted that in the present embodiment, the support plate 16 includes three second protruding portions 55 and three recesses 56.

The plural second protruding portions 55 are disposed at intervals in the circumferential direction. Preferably, the plural second protruding portions 55 are disposed at equal intervals in the circumferential direction. The second protruding portions 55 protrude to the second side in the axial direction. Each second protruding portion 55 includes a second cam protrusion 61 and a second fixation protrusion 62. The second cam protrusion 61 and the second fixation protrusion 62 are aligned in the circumferential direction. The second cam protrusion 61 and the second fixation protrusion 62 are provided as a single member.

The second cam protrusion 61 includes an SP cam surface 17a.

The second fixation protrusion 62 is greater in height than the second cam protrusion 61. In other words, a distal end surface 62a (axially second side end surface) of the second fixation protrusion 62 is located on the second side of a distal end surface 61a of the second cam protrusion 61 in the axial direction. It should be noted that the height of the second fixation protrusion 62 indicates the length thereof in the axial direction.

The radially inner peripheral wall of the second fixation protrusion 62 defines a through hole 62b extending in the axial direction.

The second fixation protrusion 62 is provided with a positioning portion 62c on the outer part thereof. The positioning portion 62c further protrudes than the distal end surface 62a of the second fixation protrusion 62 to the second side in the axial direction.

The support plate 16 further includes the recesses 56. The recesses 56 are each provided to be recessed at a predetermined depth from the axially second side lateral surface of the support plate 16. Each recess 56 is opened in the axial direction. As seen in an axial view, each recess 56 is made in the shape of an oval or rounded rectangular extending in the circumferential direction.

While the distal end surfaces 32a of the first fixation protrusions 32 of the clutch center 13 and the distal end surfaces 62a of the second fixation protrusions 62 of the support plate 16 are in contact with each other, respectively, bolts 63 (see FIG. 1) are inserted through the through holes 62b of the second fixation protrusions 62, respectively, and are further screwed into the screw holes 32b of the first fixation protrusions 32 of the clutch center 13, respectively. Accordingly, the clutch center 13 is fixed to the support plate 16.

The outer peripheral surface of each first fixation protrusion 32 is shaped along the radially inner peripheral surface of each positioning portion 62c of the support plate 16, and both surfaces are in contact with each other. With the contact of both surfaces, the support plate 16 is radially positioned with respect to the clutch center 13.

Assist Cam Mechanism 17 and Slipper Cam Mechanism 18

Figure 9:
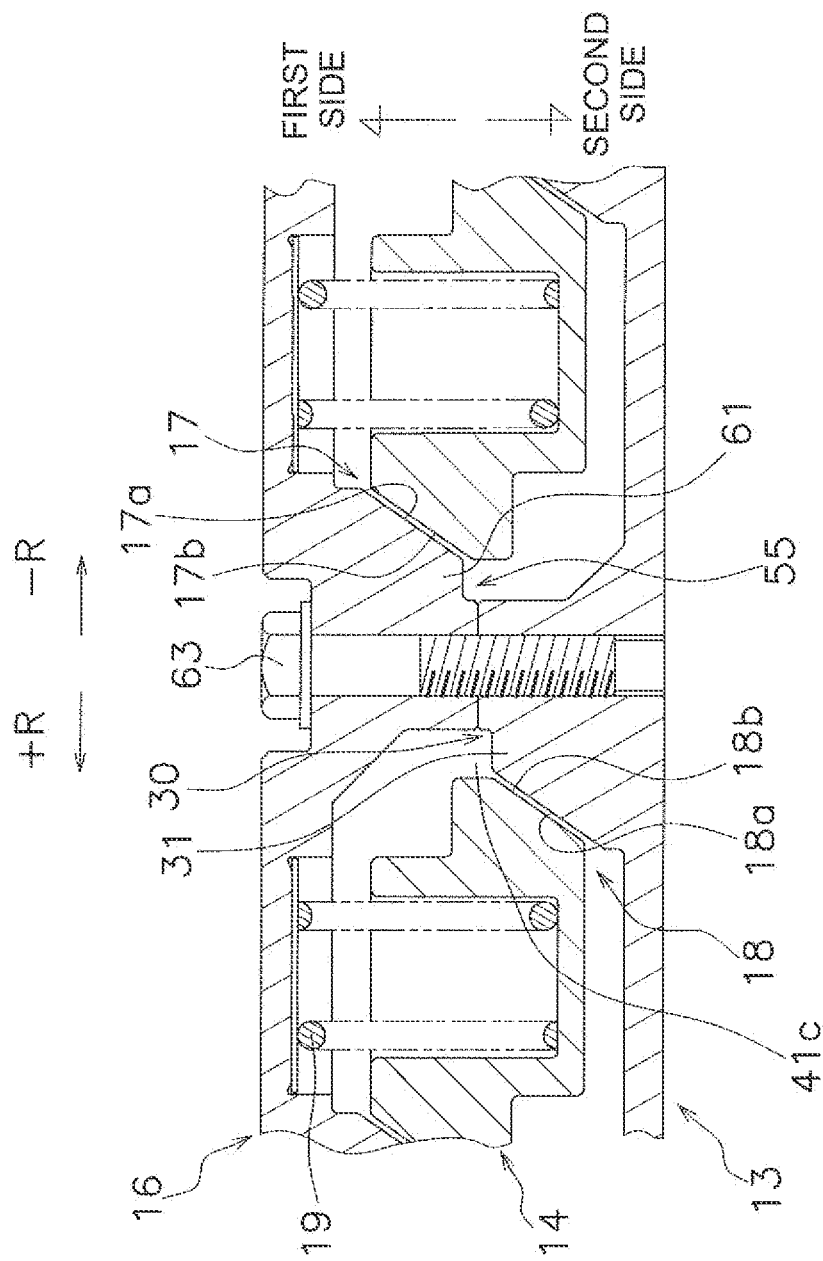
FIG. 9 is a planar net for explaining cam mechanisms.

As shown in FIG. 9, the assist cam mechanism 17 is disposed axially between the support plate 16 and the pressure plate 14. The assist cam mechanism 17 is a mechanism for increasing an engaging force of the clutch plate 11 when a forward drive force (positive-side torque, i.e., +R side torque in FIG. 9) acts on the clutch center 13 and the pressure plate 14. On the other hand, the slipper cam mechanism 18 is disposed axially between the pressure plate 14 and the clutch center 13. The slipper cam mechanism 18 is a mechanism for reducing the engaging force of the clutch plate 11 when a reverse drive force (negative-side torque, i.e., −R side torque in FIG. 9) acts on the clutch center 13 and the pressure plate 14.

Assist Cam Mechanism 17

The assist cam mechanism 17 includes a plurality of (herein three) SP cam surfaces 17a provided on the support plate 16 and a plurality of (herein three) PPa cam surfaces 17b provided on the pressure plate 14.

Each SP cam surface 17a is provided on each second cam protrusion 61 of the support plate 16. Each second protruding portion 55 is inserted into each cam hole 41c of the pressure plate 14. Besides, each SP cam surface 17a is provided on one circumferential end surface of each second protruding portion 55.

Each cam hole 41c of the pressure plate 14 is provided with each PPa cam surface 17b. Specifically, each cam hole 41c is provided with each PPa cam surface 17b on one circumferential end surface (wall surface) thereof. Each SP cam surface 17a slants to face the circumferential direction and the second side in the axial direction. Each PPa cam surface 17b slants to face the circumferential direction and the first side in the axial direction. Besides, each SP cam surface 17a is contactable to each PPa cam surface 17b.

Slipper Cam Mechanism 18

The slipper cam mechanism 18 includes a plurality of (herein three) CC cam surfaces 18a provided on the clutch center 13 and a plurality of (herein three) PPs cam surfaces 18b provided on the pressure plate 14.

Each CC cam surface 18a is provided on each first cam protrusion 31 of the clutch center 13. Each first protruding portion 30 is inserted into each cam hole 41c of the pressure plate 14. Besides, each CC cam surface 18a is provided on one circumferential end surface of each first protruding portion 30.

Each cam hole 41c of the pressure plate 14 is provided with each PPs cam surface 18b. Specifically, in each cam hole 41c, a constituent element functioning as each PPs cam surface 18b is an end surface (wall surface) circumferentially disposed in opposition to, and on the opposite side of, the lateral surface (wall surface) that each PPa cam surface 17b is provided. It should be noted that each PPa cam surface 17b and each PPs cam surface 18b are provided to be displaced from each other in the axial direction. Each CC cam surface 18a slants to face the circumferential direction and the first side in the axial direction. Each PPs cam surface 18b slants to face the circumferential direction and the second side in the axial direction. Besides, each CC cam surface 18a is contactable to each PPs cam surface 18b.

Actions

When a release operation is not being performed in the clutch device 10, the support plate 16 and the pressure plate 14 are urged to directions separating from each other by the coil springs 19. The support plate 16 is fixed to the clutch center 13 and is not moved in the axial direction. Hence, the pressure plate 14 is moved to the second side in the axial direction. As a result, the clutch plate 11 is turned to a clutch-on state.

In this state, a torque outputted from the engine is transmitted to the clutch center 13 and the pressure plate 14 through the clutch plate 11.

Next, actions of the assist cam mechanism 17 and the slipper cam mechanism 18 will be explained in detail.

When a forward drive force acts on the clutch center 13 and the pressure plate 14, in other words, when a positive-side torque acts on the clutch center 13 and the pressure plate 14, a torque herein inputted is outputted to the clutch center 13 and the pressure plate 14 through the clutch plate 11. The torque inputted to the pressure plate 14 is outputted to the support plate 16 through the assist cam mechanism 17. The torque inputted to the support plate 16 is outputted to the clutch center 13 through the respective fixation protrusions 62 and 32. In this way, the torque is transmitted from the pressure plate 14 to the support plate 16, and simultaneously, the assist cam mechanism 17 is actuated.

Specifically, when the forward drive force acts on the clutch center 13 and the pressure plate 14, the pressure plate 14 is rotated relative to the support plate 16. Accordingly, the PPa cam surfaces 17b are pressed against the SP cam surfaces 17a, respectively. The clutch center 13 is not herein moved in the axial direction. Because of this, the support plate 16 is not moved in the axial direction as well. Hence, the PPa cam surfaces 17b are moved along the SP cam surfaces 17a, respectively, whereby the pressure plate 14 is moved to the second side in the axial direction. In other words, the pressure applying portion 42 of the pressure plate 14 is moved toward the pressure receiving portion 28 of the clutch center 13. As a result, the clutch plate 11 is firmly interposed between and held by the pressure applying portion 42 and the pressure receiving portion 28. This increases the clutch engaging force.

On the other hand, when a rider returns a throttle grip to reduce acceleration, a reverse drive force acts on the clutch device 10 through the clutch center 13. In this case, the slipper cam mechanism 18 is actuated. In other words, the clutch center 13 is rotated relative to the pressure plate 14 by a torque transmitted from the transmission side. With this relative rotation, the CC cam surfaces 18a and the PPs cam surfaces 18b are pressed against each other, respectively. The clutch center 13 is not moved in the axial direction. Hence, due to this pressing, the PPs cam surfaces 18b are moved along the CC cam surfaces 18a, respectively, whereby the pressure plate 14 is moved to the first side in the axial direction. As a result, the pressure applying portion 42 is moved in a direction separating from the pressure receiving portion 28. This reduces the clutch engaging force.

When each cam mechanism 17, 18 is actuated as described above, the pressure plate 14 and both the clutch center 13 and the support plate 16 are rotated relative to each other at a predetermined angle. In other words, displacement in rotation-directional phase occurs between the pressure plate 14 and both the clutch center 13 and the support plate 16. Therefore, the coil springs 19 are configured to slip at the end surfaces thereof against the opponent members thereof.

Next, when the rider squeezes a clutch lever, the operating force is transmitted to the release mechanism (not shown in the drawings) through a clutch wire and so forth. The pressure plate 14 is moved by the release mechanism against the urging forces of the coil springs 19 to the first side in the axial direction. When the pressure plate 14 is moved to the first side in the axial direction, the pressing force applied to the clutch plate 11 from the pressure plate 14 is released, and the clutch plate 11 is turned off. In this clutch-off state, a torque is not transmitted to the clutch center 13.

In the clutch device 10, the clutch outer 12 includes the cover portions 12b. The cover portions 12b cover the teeth 51a of the clutch plate 11. Because of this, the clutch plate 11 is enhanced in anti-abrasive properties.

Moreover, each cover portion 12b includes the recess 12e on the radially inner surface thereof. Each tooth 51A a described above is disposed within the recess 12e described above. Because of this, the lubricating oil can be accumulated in the recess 12e. Accordingly, the clutch plate 11 is enhanced in anti-abrasive properties.

The depth of each recess 12e described above is greater in dimension than the height of each tooth 51a. Here, while covering each tooth 51a from the tip to the root part thereof, each cover portion 12b can accumulate the lubricating oil in the recess 12e by the structure that the depth of each recess 12e is greater than the height of each tooth 51a.

However, when excessively stored, the lubricating oil increases in viscosity. This does not enhance rather than degrades the anti-abrasive properties of the clutch plate 11. In view of the above, the clutch outer 12 further includes the openings 12x. Such excessive lubricating oil can be discharged through the openings 12x.

The clutch outer 12 includes the plural coupling portions 12c aligned in an annular shape. Each coupling portion 12c couples the distal ends of each adjacent pair of the cover portions 12b. Hence, even when centrifugal forces act on the clutch outer 12, the distal ends of the cover portions 12b are prevented from flaring radially outward by the structure that each coupling portion 12c couples the distal ends of each adjacent pair of the cover portions 12b. Because of this, the clutch outer 12 is enhanced in strength.

The radially outer surfaces of the plural cover portions 12b and those of the plural coupling portions 12c form a single outer peripheral surface. In other words, the radially outer surfaces of the cover portions 12b do not protrude radially outward with respect to those of the coupling portions 12c. Because of this, even when centrifugal forces act on the clutch outer 12, stresses are unlikely to concentrate on the cover portions 12b. Consequently, the clutch outer 12 is enhanced in strength.

Each coupling portion 12c is disposed between each adjacent pair of the sidewall portions 121e. Each coupling portion 12c is located radially outside the radially inner surfaces of each adjacent pair of the sidewall portions 121e. Hence, the lubricating oil is easily discharged even with the coupling portions 12c herein provided. This will be explained in detail. Among the constituent plates of the clutch plate 11, the outermost one located on the first side is opposed to the coupling portions 12c and does not face the openings 12x. Because of this, the lubricating oil is not easily discharged through the openings 12x. When excessively provided, the lubricating oil does not enhance rather than degrades anti-abrasive properties of the clutch plate 11. However, the radially inner surface of each coupling portion 12c is herein further recessed radially outward than that of each cover portion 12b. Hence, the lubricating oil can be discharged through the recessed part.

Other Embodiments

The present invention is not limited to the embodiment described above, and a variety of changes or modifications can be made without departing from the scope of the present invention.

Modification 1

In the embodiment described above, the clutch outer 12 includes the coupling portions 12c. However, the structure of the clutch outer 12 is not limited to this. The clutch outer 12 may not include the coupling portions 12c. In this case, the clutch outer 12 can be made lightweight.

Modification 2

The embodiment described above has been explained with the clutch center 13 as an exemplary first rotor and the pressure plate 14 as an exemplary second rotor. In other words, in the embodiment described above, the present invention has been applied to a so-called pull-type clutch device that the pressure plate 14 is moved to the first side in the axial direction so as to turn off the clutch plate 11. However, the present invention is similarly applicable to a so-called push-type clutch device as well.

Figure 10:
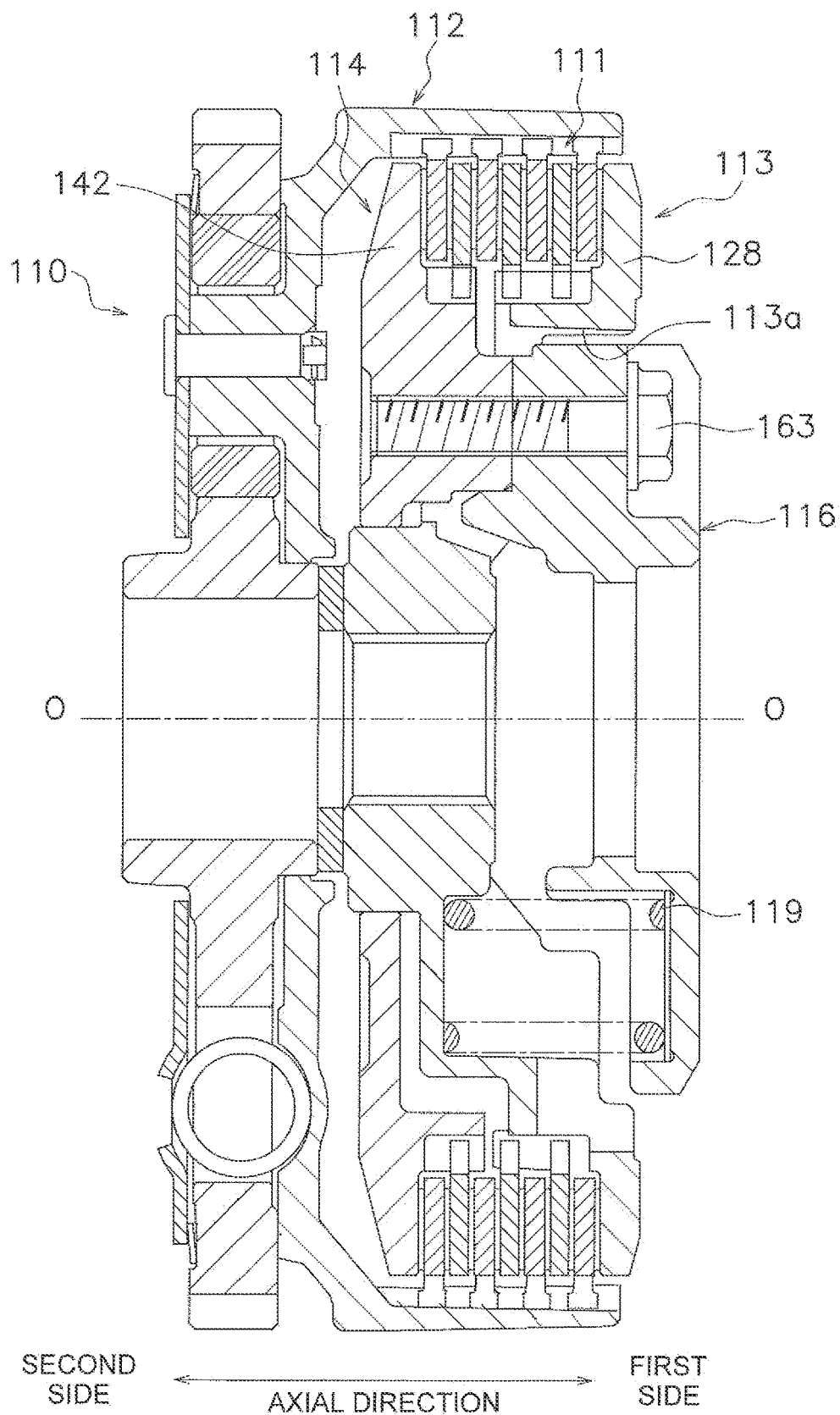
FIG. 10 is a cross-sectional view of a push-type clutch device according to another embodiment.

FIG. 10 shows a push-type clutch device 110.

In the push-type clutch device 110, a pressure plate 114 corresponds to the first rotor; a clutch center 113 corresponds to the second rotor; a support plate 116 corresponds to the support member.

Specifically, in the push-type clutch device 110, the pressure plate 114, the clutch center 113, and the support plate 116 are disposed from the second side to the first side in the axial direction. The pressure plate 114 and the support plate 116 are fixed to each other by at least one bolt 163 through at least one opening 113a provided in the clutch center 113. Besides, at least one coil spring 119 is disposed between the clutch center 113 and the support plate 116. Moreover, a clutch plate 111 is disposed between a pressure applying portion 142 of the pressure plate 114 and a pressure receiving portion 128 of the clutch center 113. These respective members are accommodated in the interior of a clutch outer 112 in a similar manner to those of the pull-type clutch device 10.

The clutch center 113 is not moved in the axial direction. Hence, the support plate 116 is urged by the at least one coil spring 119 to the first side in the axial direction. In other words, the pressure plate 114 fixed to the support plate 116 is urged to the first side in the axial direction and is pressed toward the clutch center 113, whereby the clutch plate 111 is turned on.

Then, the support plate 116 and the pressure plate 114 are moved to the second side in the axial direction against the urging force of the at least one coil spring 119, whereby the clutch plate 111 is turned off.

Modification 3

The configuration of the clutch outer 12 is not limited to that in the embodiment described above. For example, in the embodiment described above, the bottom portion 12a and the cover portions 12b are integrated in the clutch outer 12. However, these portions 12a and 12b may be provided as separate members. The method of forming the bottom portion 12a and the cover portions 12b in the clutch outer 12 is not limited to aluminum die casting.

Modification 4

In the embodiment described above, the coil springs 19 are configured to urge the pressure plate 14. However, disc springs or so forth may be used instead of the coil springs 19.

REFERENCE SIGNS LIST 10, 110 Clutch device
11, 111 Clutch plate
12, 112 Clutch outer
12a Bottom portion
12b Cover portion
12c Coupling portion
12x Opening
13, 113 Clutch center
14, 114 Pressure plate
27 Tubular portion of clutch center (first tubular portion)
28 Pressure receiving portion
30 First protruding portion
31 First cam protrusion
41 Tubular portion of pressure plate (second tubular portion)
42 Pressure applying portion

What is claimed is:

1. A clutch device comprising:
    a clutch plate including a plurality of teeth circumferentially disposed apart from each other; and
    a clutch outer including a bottom portion, a plurality of cover portions, and a plurality of openings, the bottom portion having a disc shape, the bottom portion greater in diameter than the clutch plate, the plurality of cover portions axially extending from an outer peripheral edge of the bottom portion without protruding radially outward with respect to a radially outermost surface of the clutch outer, the plurality of cover portions being configured to cover the plurality of teeth, the plurality of cover portions circumferentially disposed apart from each other, each of the plurality of openings disposed between each adjacent pair of the plurality of cover portions, each of the plurality of openings radially opened.

2. The clutch device according to claim 1, wherein
    each of the plurality of cover portions includes a recess on a radially inner surface thereof, and
    each of the plurality of teeth is disposed in the recess.

3. The clutch device according to claim 2, wherein the recess has a depth greater in dimension than a height of each of the plurality of teeth.

4. The clutch device according to claim 1, wherein the clutch outer includes a plurality of coupling portions, each adjacent pair of the plurality of cover portions being coupled to each other at distal ends thereof through each of the plurality of coupling portions.

5. The clutch device according to claim 2, wherein the recess of each of the plurality of cover portions is defined by surfaces, the surfaces including a bottom portion-side surface slanting to approach the bottom portion from radially outside to radially inside.

6. The clutch device according to claim 4, wherein the plurality of coupling portions are disposed radially outside with respect to radially inner surfaces of the plurality of cover portions.

7. The clutch device according to claim 1, wherein the bottom portion and the plurality of cover portions are integrally molded.

* * * * *